United States Patent
Ogawa et al.

(10) Patent No.: US 6,278,508 B1
(45) Date of Patent: Aug. 21, 2001

(54) REFLECTION TYPE LIQUID CRYSTAL DISPLAY DEVICE

(75) Inventors: Tetsu Ogawa, Ishikawa; Shingo Fujita, Nara; Hiroaki Mizuno; Yoshio Iwai, both of Ishikawa, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/351,531

(22) Filed: Jul. 12, 1999

(30) Foreign Application Priority Data

Jul. 10, 1998 (JP) ................................. 10-195400

(51) Int. Cl.[7] .................................. G02F 1/1335
(52) U.S. Cl. ........................ 349/113; 349/86; 349/88; 349/89
(58) Field of Search ......................... 349/113, 86, 88, 349/89, 92

(56) References Cited

U.S. PATENT DOCUMENTS

| | | | |
|---|---|---|---|
| 4,991,940 | * 2/1991 | Dalisa et al. | 349/86 |
| 5,283,675 | * 2/1994 | Ooi et al. | 349/86 |
| 5,724,111 | 3/1998 | Mizobata et al. | |
| 6,144,429 | * 11/2000 | Nakai et al. | 349/113 |

FOREIGN PATENT DOCUMENTS

| | | |
|---|---|---|
| 813094 | 12/1997 | (EP) . |
| 10195400 | 7/1998 | (JP) . |

OTHER PUBLICATIONS

European Search Report dated Mar. 12, 2001, application No. EP99113451.

Sonehara et al., "Full–color reflective LCD using internal–reflection inverted–scattering (IRIS) mode", vol. 28, May 13, 1997, pp. 1023–1026, XP000722856.

* cited by examiner

Primary Examiner—James A. Dudek
(74) Attorney, Agent, or Firm—Ratner & Prestia

(57) ABSTRACT

A reflector electrode is provided with hills and valleys thereon, and the reflector electrode is formed on an inside face of a transparent substrate having a transparent electrode and an opposite substrate. Light-scattering-liquid-crystal is provided with forward-scattering component and back-scattering component, so that scattering of reflected light from the reflector electrode is increased when the light-scattering-liquid-crystal is transparent. As a result, contrast is less dependent on a viewing angle, and a brighter quality display with higher color purity can be obtained.

24 Claims, 5 Drawing Sheets

REFLECTION TYPE LIQUID CRYSTAL DISPLAY DEVICE

FIELD OF THE INVENTION

The present invention relates to a reflection type liquid crystal display device where a polarizing plate is eliminated and a reflector electrode is disposed within a liquid cell.

BACKGROUND OF THE INVENTION

In recent year, Inter-Net has prevailed dramatically in the world, which promotes to prepare information-related infrastructure, through which everybody can get necessary information at any place and anytime. As an interface between this infrastructure and users, a mobile information tool (hereinafter referred to as "MIT") plays a key role.

The MIT, easy to carry, is desirably thin in size, light in weight, and requires a display driven by low power. A reflection type liquid crystal display device (hereinafter referred to as "reflection type LCD"), which is free from a back light, is mostly suitable for this application.

Actually, more than half of the commercialized MITs employ the reflection type LCD. When environments, such as low-power-consumption CPUs, high-speed-communications, OS for portable terminals are well prepared, the MIT business looks promising. The reflection type LCD thus will play more important role as a major component of the MIT. In most of conventional reflection type LCDs, polarizing plates are disposed outside an upper and lower glass substrates, and reflectors are placed on top of that. However, another reflection type LCD, where the polarizing plates are eliminated and a mirror-reflector-electrode is disposed in a cell of LCD and light scatter LCD is used as a modulating layer, is proposed in the following document. This proposed type LCD is expected to improve a reflection factor and accommodate color-LCDs. (written by T. Sonehara, M. Yazaki, H. Iisaka, Y. Tsuchita, H. Sakata, J. Amako, and T. Takeuchi in SID 97 DIGEST, page 1023–1026 published in 1997)

Since light travels free from being absorbed because of no polarizing plates, this newly proposed LCD can display a brighter image, and also when a color filter is used to accommodate the color LCD, this LCD is free from color-purity-degradation due to color mixture. The reason is because the reflector electrode is disposed in the cell so that parallax due to a thickness of the glass can be eliminated.

The conventional reflection type LCD having no polarizing plates is described hereinafter with reference to the accompanying drawings.

FIG. 8 is a cross section showing a structure of a reflection type monochrome LCD where a thin-film-transistor (TFT) drives a light scattering LCD. Gate electrode 210 is selectively formed on substrate 201, and gate-insulating layer 211 is formed on top of that to cover gate electrode 210. Semiconductor layer 212 is island-likely formed just above gate electrode 210 and on gate-insulating film 211. Then, source electrode 213 and drain electrode 214 are formed, whereby a TFT, i.e. a switching element, is constructed.

Reflector electrode 202, i.e. a pixel electrode, has a mirror-finished surface, and is coupled electrically to drain electrode 214 via inter-layer insulating layer 215.

Light scattering LCD 203 is sandwiched by substrate 210 and opposite transparence substrate 205 in which a transparent electrode is formed.

Light scattering LCD 203 is formed by curing a mixed system of liquid crystal material having refractive-index-anisotropy and acrylic polymer material. The thickness of the mixed-system-liquid-crystal is optimized, and mixing ratio of liquid crystal vs. polymer material is also optimized so-that the light scattering can be adjusted basically to be forward scatter.

For instance, when refractive index of liquid crystal material vs. regular light is "$n\perp$", and that vs. abnormal light is "$n\|$", and the relation of $\Delta n = n\| - n\perp > 0$ is satisfied, the refractive index of the polymer material is set at approximately same as "$n\perp$". In this case, light scattering liquid crystal takes a form of scattering when power is OFF, and a form of transparence when the power is ON.

The reflection type LCD having the construction discussed above is called "polarizer-free type", through which light passes no polarizer, while in the conventional two-polarizer-type, light passes through the polarizers four times. The polarizer-free type thus can produce brighter display. Since this type can also incorporate a reflector electrode in a liquid crystal cell, this type produces a display free from parallax. In a case of color reflection type LCD employing a color filter, in particular, the probability where an incident light and outgoing light travel different color regions is almost minimized. This also contributes to producing a brighter display.

A display principle of the reflection type LCD is described hereinafter with reference to the accompanying drawings.

FIG. 9 illustrates a display principle of the conventional "polarizer-free type" reflection LCD. When the power is OFF, incident light to the liquid crystal panel is scattered according to a difference between the refraction factors of the liquid crystal and polymer. Further, the incident light is reflected by the mirror-finished surface of reflector electrode, and diffusely reflected as shown in FIG. 9. On the other hand, when the power is ON, light-scattering-liquid-crystal becomes almost transparent, and most of the incident light is reflected like by mirror. At this time, display including intermediate key can be seen by a viewer "A", because brightness is modulated between the respective reflected brightness "A-on" and "A-off" at power ON and OFF. The reflected brightness at power OFF, corresponding to white, less depends on an angle. Further, not only a higher reflected brightness can be obtained because of no absorption by the polarizing plates but also a high purity white, proper to the light scattering liquid crystal, can be obtained. As a result, an excellent visibility similar to that of "paper" can be realized.

However, in this conventional reflection type LCD, an irregular display on the reflected brightness at power ON, corresponding to black, is observed through some direction. A viewer "B" in FIG. 9 sees intense mirror-reflected light "B-on" because the viewer "B" is located in the regular reflective direction and the light scattering liquid crystal becomes transparent when the power is ON corresponding to black. A reflected brightness "B-off" on white level at the viewer "B" has less brightness than the reflected light "B-on", therefore, brightness order in an image is reversed, i.e. reverse image is produced. The area where such an irregular display occurs approximately covers an angle area of 10° in the regular reflecting direction with regard to the incident light.

SUMMARY OF THE INVENTION

The present invention addresses the problems discussed above, and aims to provide a reflection type LCD having a rather simple construction, and can display a quality picture free from an irregular display from any viewing angles.

The reflection type LCD of the present invention has a reflector electrode having hills and valleys thereon, and light-scattering-liquid-crystal includes both of forward and back scattering components. This construction increases scattering reflection light when a light-scattering-liquid-crystal is transparent, i.e. power is ON, and lowers an intensity of the reflection light returned to outside of the liquid crystal panel. The mirror-reflected component of reflection light corresponding to black level can be reduced, whereby contrast can be less dependent on a viewing angle. Lowering of reflected brightness on white level at power OFF can be also restrained. As a result, the reflection type LCD of the present invention can produce a quality picture.

DESCRIPTION OF PREFERRED EMBODIMENTS

Exemplary embodiments of the present invention are described hereinafter with reference to the accompanying drawings.

(Exemplary Embodiment 1)

Figure 1:
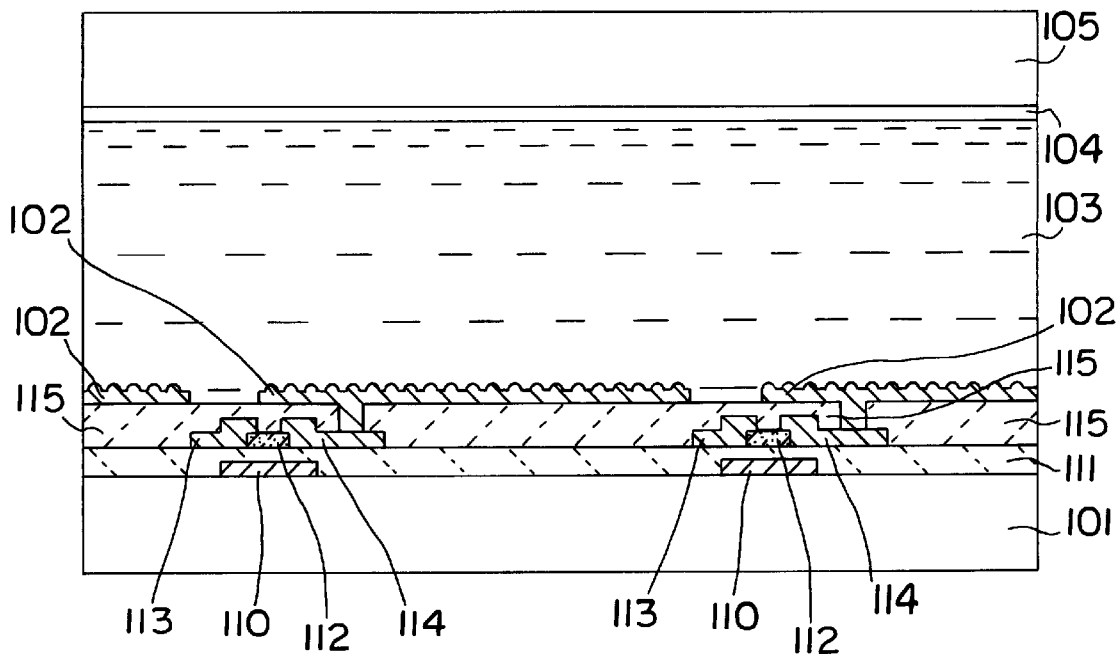
FIG. 1 is a cross section of a reflection type LCD in accordance with a first exemplary embodiment of the present invention.

FIG. 1 is a cross section of a reflection type LCD in accordance with the first exemplary embodiment of the present invention. It has basically the same structure as the conventional reflection type LCD. The reflection type LCD in accordance with the first exemplary embodiment differs from the conventional one in the following two points: (a) Hills and valleys are formed on the surface of reflector electrode 102. (b) A predetermined back-scattering is provided to light-scattering-liquid-crystal.

The hills and valleys on reflector electrode 102 are formed by the following method. First, apply photosensitive acrylic resin, (e.g. PC302 made by JSR Inc.) on entire substrate 101 on which TFT is formed, so that interlayer insulating layer 115 is formed. Second, form contact holes, as well as hills and valleys by using a given photo-mask. Then, form selectively aluminum including 0.9 atomic % of zirconium thereby forming reflector electrode 102 having hills and valleys thereon.

The light-scattering-liquid-crystal 103 having back-scattering characteristics is formed by this way: first, mix nematic-liquid-crystal and acrylic polymer oligomer at weight ratio of 2:8, second, fill the mixed material into the liquid crystal panel, and finally irradiate ultraviolet ray thereby curing the mixed material. A thickness of the liquid crystal layer is set at 5–10 $\mu$m. The back-scattering increases, which raises the brightness of white when the power is OFF, at greater thickness of liquid crystal layer. This entails boosting the driving voltage. On the contrary, the brightness of white lowers at thinner cell thickness, which also entails lowering the driving voltage. An increment of the driving voltage is approximately 1V/$\mu$m. An optimal thickness of the liquid crystal is selected responsive to a practical reflected brightness and driving capacity of the driver.

Figure 2:
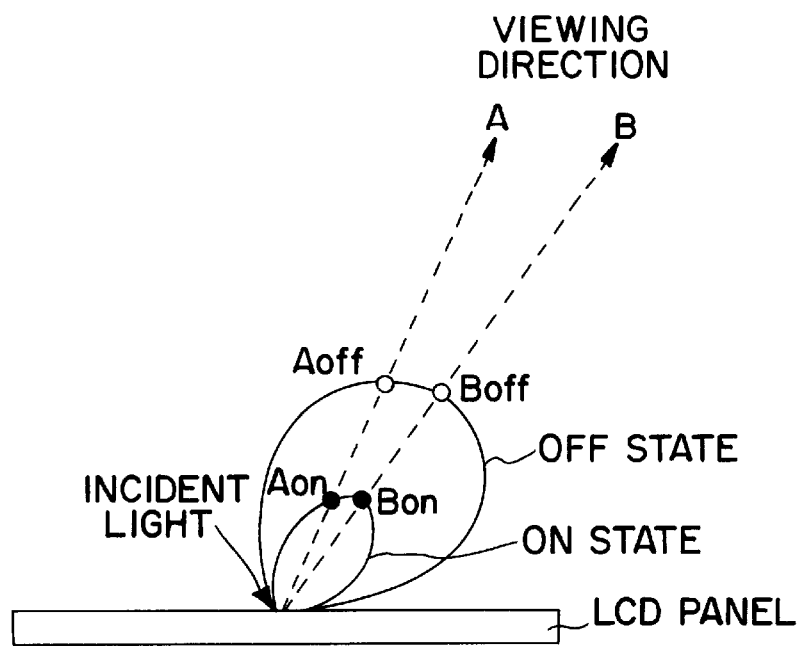
FIG. 2 shows characteristics illustrating a display principle of the reflection type LCD shown in FIG. 1.

FIG. 2 illustrates a display principle of the reflection type LCD in accordance with the first exemplary embodiment of the present invention.

Figure 9:
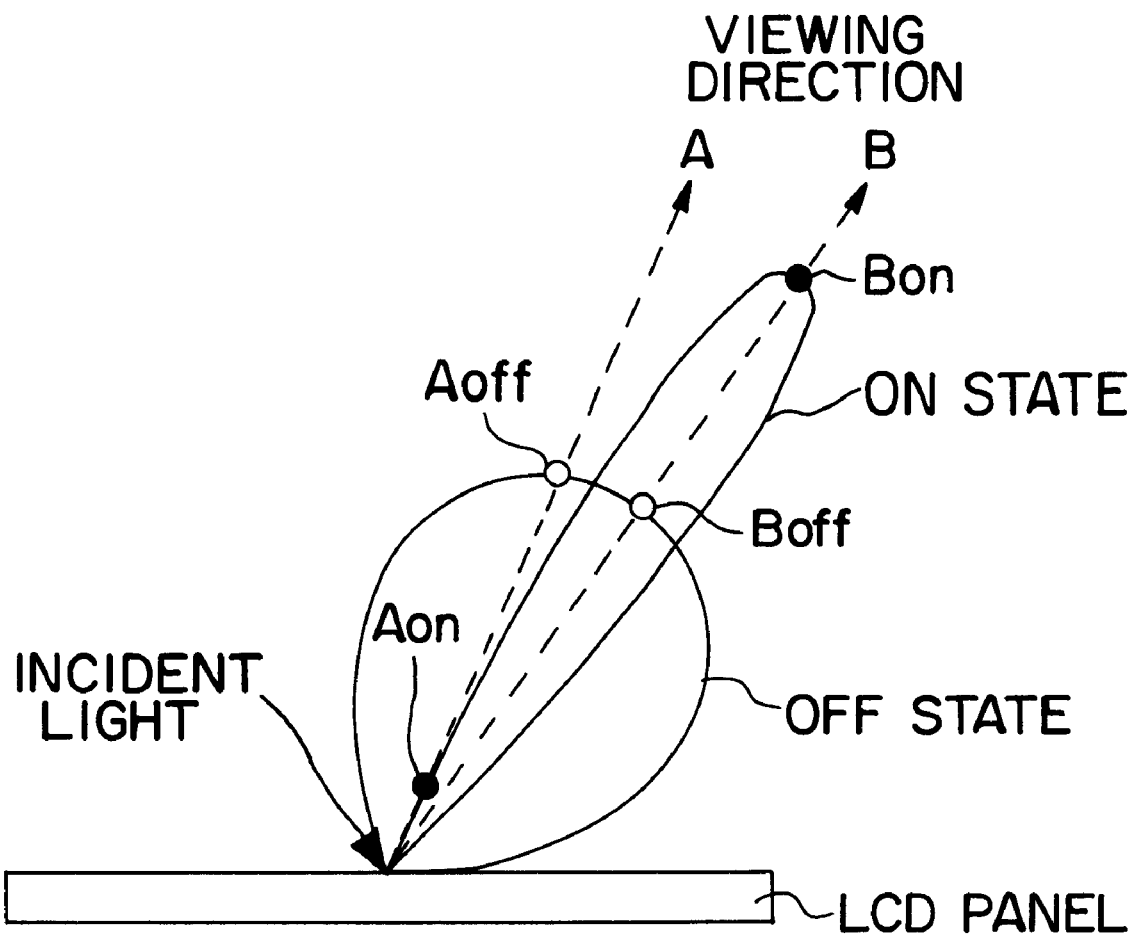
FIG. 9 shows characteristics illustrating a display principle of the conventional reflection type LCD shown in FIG. 8.

As FIG. 2 illustrates, the reflection characteristics at power ON corresponding to the black level has a lower mirror-property than that in the conventional one shown in FIG. 9, and it stays, from every view angle, always lower than the reflection characteristics at power OFF corresponding to the white level. Because light scattering increases on the reflector electrode due to its hills and valleys, and further, total reflection component at the boundary between the transparent substrate and the air increases, so that outgoing light from the liquid crystal panel decreases. In fact, any shapes of hills and valleys produce a certain effect; however, setting a diffuse reflectance at a certain range will maximizes the effect. In other words, when the relation of $0.8 \leq$ Rdr of the reflector electrode $\leq 1.0$ is satisfied, scattering of the reflection light increases, and also outgoing quantity of light from the liquid crystal panel can be restrained. Where, Rdr=(a diffuse reflectance of total reflection light converged through an integration sphere)−(regular reflection component). This relation can be realized, e.g. by forming the average slope angle of hills and valleys at not less than 160°.

Regarding the reflection characteristics corresponding to the white level, on the other hand, providing the light-scattering-liquid-crystal with back-scattering characteristics can increase the quantity of diffuse-bulk-reflection-light directly from the light-scattering-liquid-crystal-layer. It also restrains the lowering of an intensity of outgoing light reflected by the hills and valleys formed on the reflector electrode. As a result, a substantially bright display can be obtained.

(Exemplary Embodiment 2)

Figure 3:
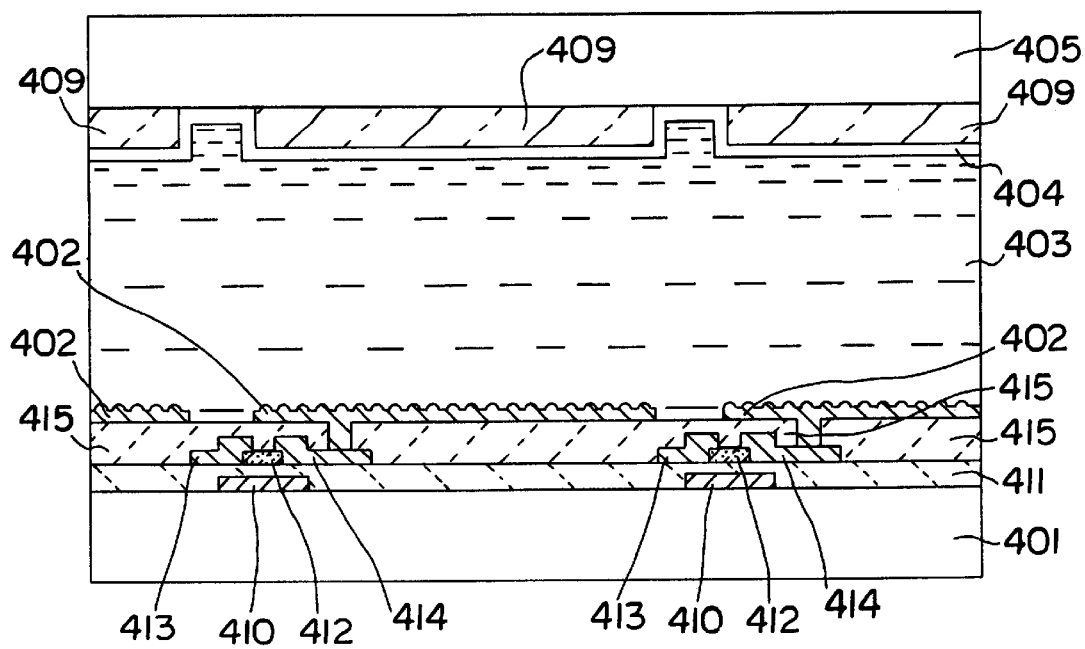
FIG. 3 is a cross section of a reflection type LCD in accordance with a second exemplary embodiment of the present invention.

FIG. 3 illustrates a construction of a reflection type LCD in accordance with the second exemplary embodiment of the present invention. A different point from the first exemplary embodiment is that color filter 409 is formed inside face of transparent substrate 405. Due to this arrangement, the presence of a reflecting face within a cell can almost minimize the probability where an incident light and outgoing light travel different color regions. As a result, a color reflection type LCD with high brightness and high color purity can be realized.

(Exemplary Embodiment 3)

Figure 4:
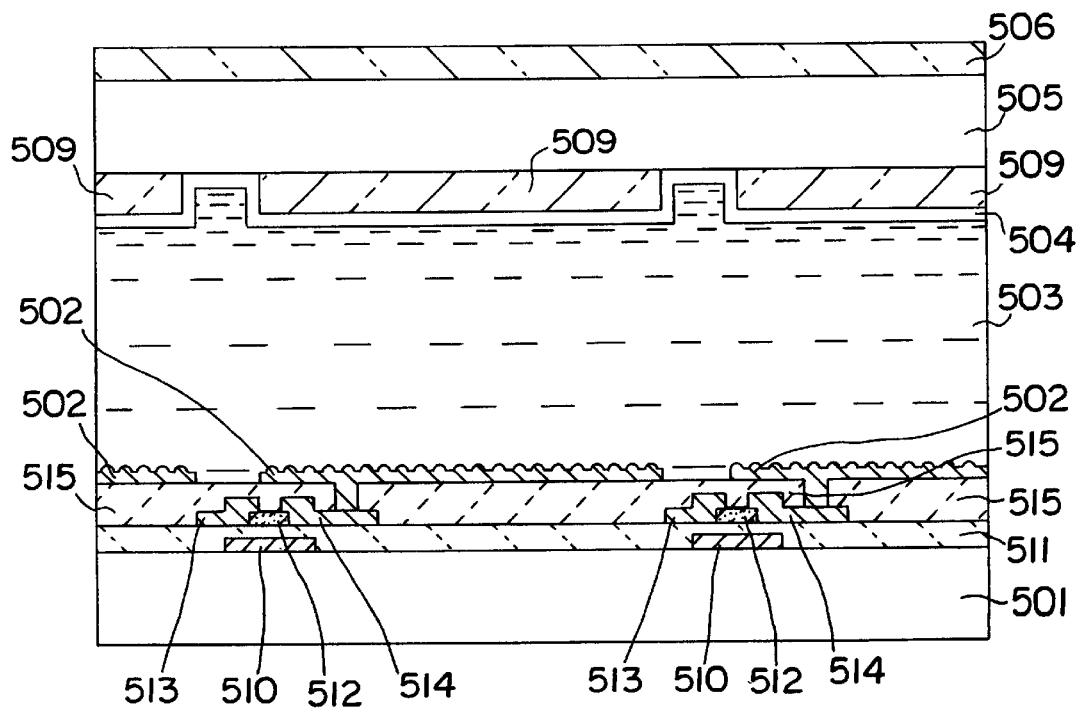
FIG. 4 is a cross section of a reflection type LCD in accordance with a third exemplary embodiment of the present invention.

FIG. 4 illustrates a construction of a reflection type LCD in accordance with the third exemplary embodiment of the present invention. A difference from the second exemplary embodiment is that scattering plate 506 is disposed on outer face of transparent substrate 505. Scattering plate 506 is made of a film having isotropic scattering function that is produced by diffusing ultra-fine grains in a polymer substrate.

Incident light and outgoing light are scattered when they travel through scattering plate 506, the scattering characteristics are thus further increased when the power is ON, and a better black level can be realized.

(Exemplary Embodiment 4)

Figure 5:
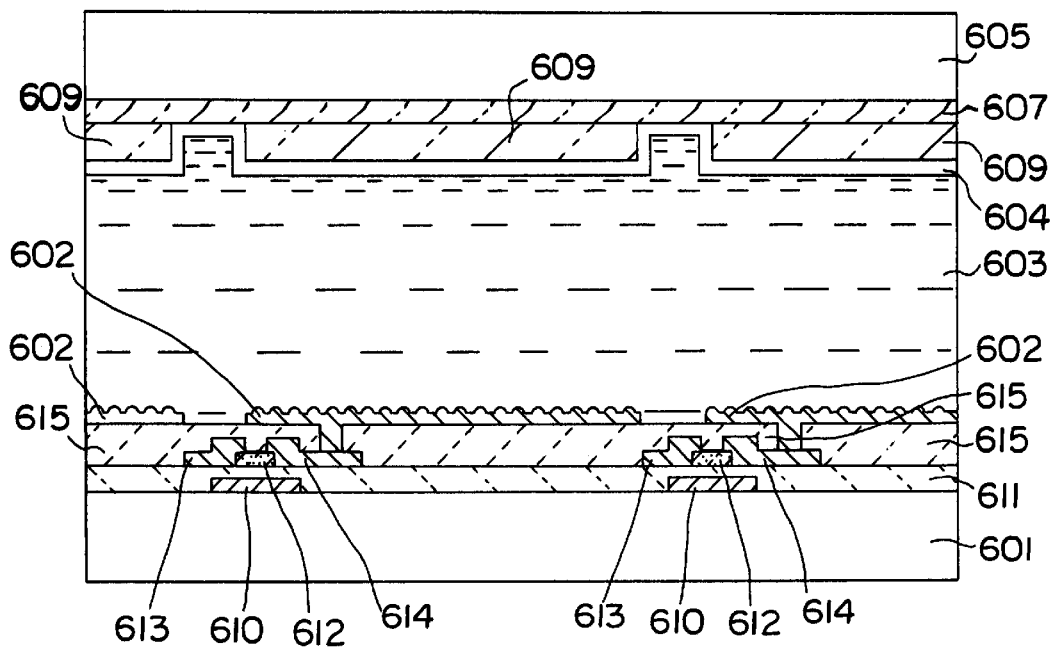
FIG. 5 is a cross section of a reflection type LCD in accordance with a fourth exemplary embodiment of the present invention.

FIG. 5 illustrates a construction of a reflection type LCD in accordance with the fourth exemplary embodiment of the present invention. A different point from the third exemplary embodiment is that scattering film 607 is formed inside transparent substrate 605. Scattering film 607 is formed by applying resin on the inner face of transparent substrate 605 with a spinner, and then being cured. The resin is produced by diffusing ultra-fine grains in oligomer of acrylic polymer. Color filter 609 and transparent electrode 604 are formed on the cured resin.

According to this fourth exemplary embodiment, the presence of scattering film 607 having a light scattering function within a liquid crystal cell can minimize dimming of an image due to a thickness of transparent substrate 605, i.e. a distance between the reflecting face and the scattering face. As a result, a clear display can be realized.

(Exemplary Embodiment 5)

Figure 6:
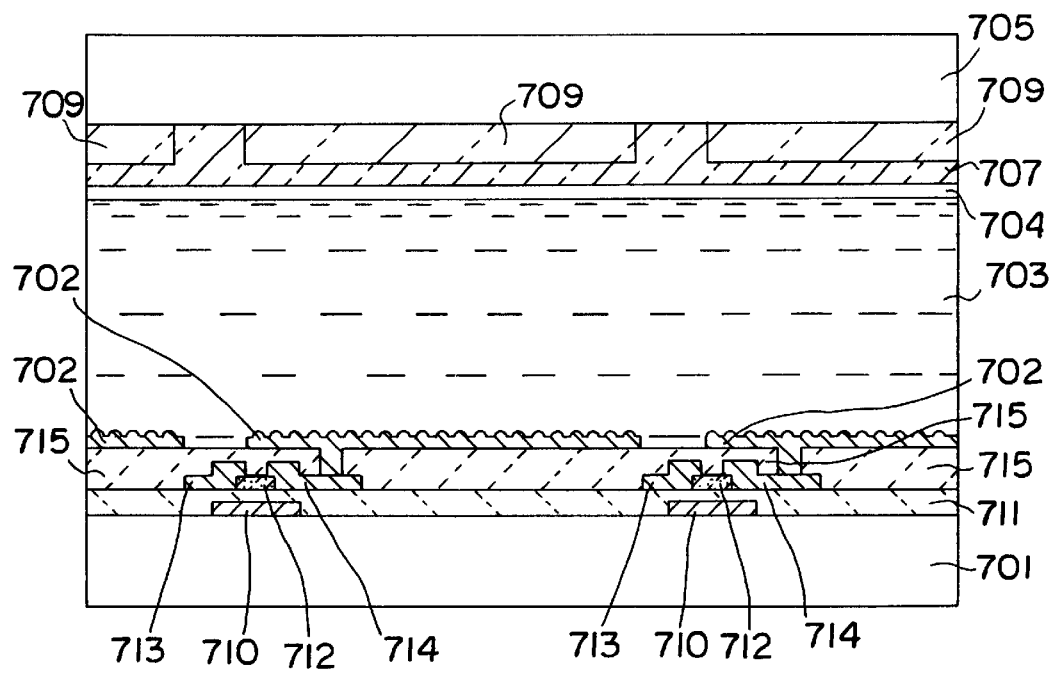
FIG. 6 is a cross section of a reflection type LCD in accordance with a fifth exemplary embodiment of the present invention.

FIG. 6 illustrates a construction of a reflection type LCD in accordance with the fifth exemplary embodiment of the present invention. A different point from the fourth exemplary embodiment is that scattering film 707 is formed between color filter 709 and transparent electrode 704. The same materials and production method of the scattering film used in the fourth exemplary embodiment are employed to scattering film 707, which has another function, i.e. a protective film for color filter 709, in this fifth embodiment. As a result, reliability of a liquid crystal panel is increased.

(Exemplary Embodiment 6)

Figure 7:
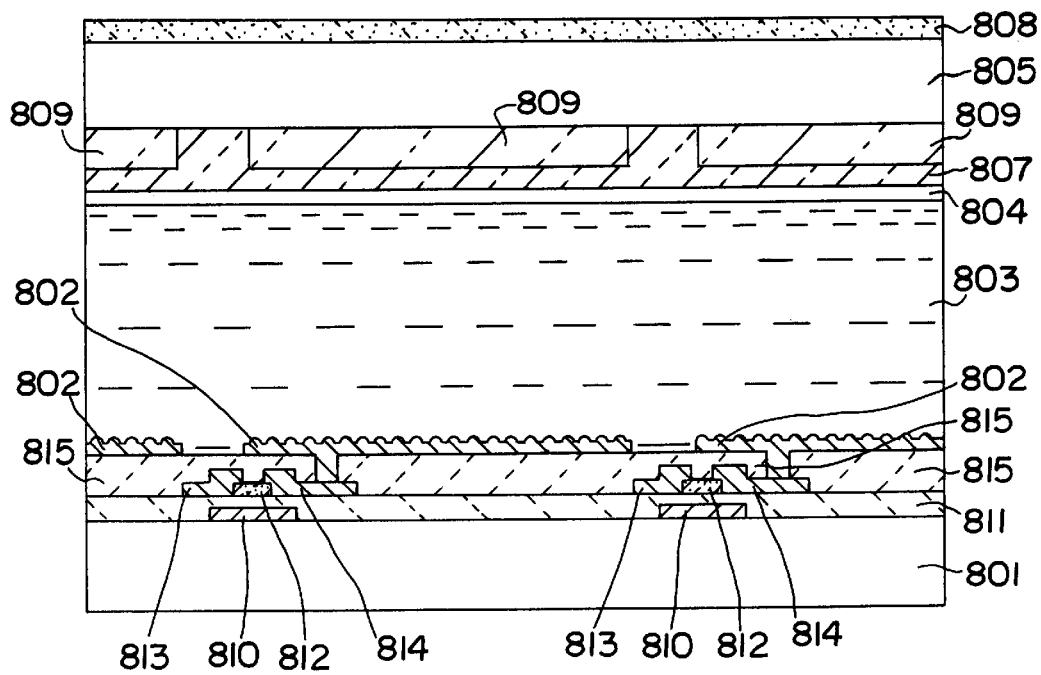
FIG. 7 is a cross section of a reflection type LCD in accordance with a sixth exemplary embodiment of the present invention.
Figure 8:
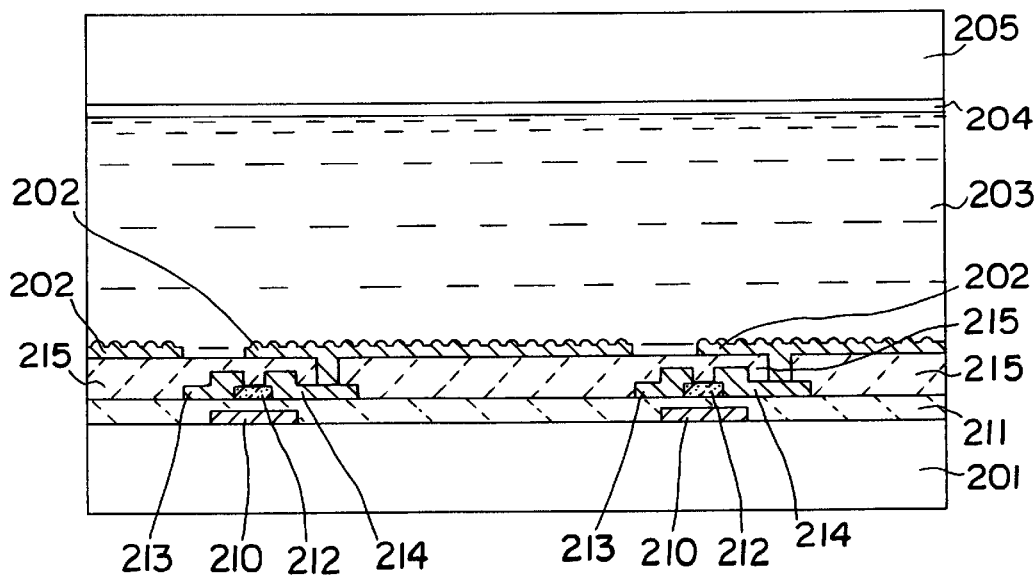
FIG. 8 is a cross section of an conventional reflection type LCD.

FIG. 7 illustrates a construction of a reflection type LCD in accordance with the sixth exemplary embodiment of the present invention. A different point from the fifth exemplary embodiment is that reflection-protecting-layer 808 is formed on outer face of transparent substrate 805. Reflection-protecting-layer 808 is made of thin-multilayer-film comprising $SiO_2$ and ITO.

According to this sixth exemplary embodiment, unnecessary reflection on a surface of liquid crystal panel is restrained, thereby increasing a quantity of incident light to the liquid crystal panel. At the same time, the contrast can be improved.

The present invention is not limited to the liquid crystal panel driven by the TFT liquid crystal discussed above, but it is applicable to a case where metal-insulator-metal (IM) is used as a switching element as well as a liquid crystal panel of simple matrix type.

As the embodiments discussed above prove, the reflection type LCD with light-scattering-liquid-crystal that incorporates the reflector electrode can produce the following advantages.

(1) Component reflected from mirror-surface in the regular reflection direction can be reduced when the liquid crystal layer is transparent.

(2) Contrast is less dependent on a viewing angle.

As a result, a brighter and quality display with higher color purity can be realized.

What is claimed is:

1. A reflection type liquid crystal display device comprising:

(a) light-scattering-liquid-crystal sandwiched by a transparent substrate and an opposite substrate;

(b) a reflector electrode formed in the opposite substrate; and (c) a transparent electrode formed in the transparent substrate, wherein said reflector electrode has hills and valleys thereon, and said light-scattering-liquid-crystal includes both of forward scattering component and back scattering component.

2. The reflection type liquid crystal display device as defined in claim 1 wherein diffuse reflectance (Rdr) of said reflector electrode satisfies a following condition: $0.8 \leq Rdr \leq 1.0$, where Rdr=(a diffuse reflectance of total reflection light converged through an integration sphere)−(regular reflection component).

3. The reflection type liquid crystal display device as defined in claim 1 wherein a color filter is disposed on an inner face of the transparent substrate.

4. The reflection type liquid crystal display device as defined in claim 1 wherein a scattering plate is disposed on an outer face of the transparent substrate.

5. The reflection type liquid crystal display device as defined in claim 3 wherein a scattering plate is disposed on an outer face of the transparent substrate.

6. The reflection type liquid crystal display device as defined in claim 1 wherein a scattering film is disposed on the inner face of the transparent substrate.

7. The reflection type liquid crystal display device as defined in claim 3 wherein a scattering film is disposed on the inner face of the transparent substrate.

8. The reflection type liquid crystal display device as defined in claim 1, wherein a reflection-protecting-layer is disposed on an outer-most face of the transparent substrate.

9. The reflection type liquid crystal display device as defined in claim 3 wherein a reflection-protecting-layer is disposed on an outer most face of the transparent substrate.

10. The reflection type liquid crystal display device as defined in claim 4 wherein a reflection-protecting-layer is disposed on an outer-most face of the transparent substrate.

11. The reflection type liquid crystal display device as defined in claim 6 wherein a reflection-protecting-layer is disposed on an outer-most face of the transparent substrate.

12. The reflection type liquid crystal display device as defined in claim 2 wherein a color filter is disposed on an inner face of the transparent substrate.

13. The reflection type liquid crystal display device as defined in claim 2 wherein a scattering plate is disposed on an outer face of the transparent substrate.

14. The reflection type liquid crystal display device as defined in claim 12 wherein a scattering plate is disposed on an outer face of the transparent substrate.

15. The reflection type liquid crystal display device as defined in claim 2 wherein a scattering film is disposed on the inner face of the transparent substrate.

16. The reflection type liquid crystal display device as defined in claim 12 wherein a scattering film is disposed on the inner face of the transparent substrate.

17. The reflection type liquid crystal display device as defined in claim 2 wherein a reflection-protecting-layer is disposed on an outer-most face of the transparent substrate.

18. The reflection type liquid crystal display device as defined in claim 3 wherein a reflection-protecting-layer is disposed on an outer-most face of the transparent substrate.

19. The reflection type liquid crystal display device as defined in claim 14 wherein a reflection-protecting-layer is disposed on an outer-most face of the transparent substrate.

20. The reflection type liquid crystal display device as defined in claim 7 wherein a reflection-protecting-layer is disposed on an outer-most face of the transparent substrate.

21. The reflection type liquid crystal display device as defined in claim 16 wherein a reflection-protecting-layer is disposed on an outer-most face of the transparent substrate.

22. The reflection type liquid crystal display device as defined in claim 12 wherein a reflection-protecting-layer is disposed on an outer most face of the transparent substrate.

23. The reflection type liquid crystal display device as defined in claim 13 wherein a reflection-protecting-layer is disposed on an outer-most face of the transparent substrate.

24. The reflection type liquid crystal display device as defined in claim 15 wherein a reflection-protecting-layer is disposed on an outer-most face of the transparent substrate.

\* \* \* \* \*